US011821448B2

(12) United States Patent
Takeda

(10) Patent No.: US 11,821,448 B2
(45) Date of Patent: Nov. 21, 2023

(54) BLIND BOLT

(71) Applicant: NEWFREY LLC, New Britain, CT (US)

(72) Inventor: Atsushi Takeda, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 428 days.

(21) Appl. No.: 17/144,830

(22) Filed: Jan. 8, 2021

(65) Prior Publication Data

US 2021/0123467 A1    Apr. 29, 2021

Related U.S. Application Data

(63) Continuation of application No. PCT/JP2019/029257, filed on Jul. 25, 2019.

(30) Foreign Application Priority Data

Jul. 31, 2018    (JP) .................................. 2018-143197

(51) Int. Cl.
*F16B 13/06*    (2006.01)

(52) U.S. Cl.
CPC ............ *F16B 13/066* (2013.01); *F16B 13/06* (2013.01)

(58) Field of Classification Search
CPC .... F16B 13/004; F16B 13/065; F16B 13/066; F16B 13/0858; F16B 13/122; F16B 13/124; F16B 13/128; F16B 13/06
USPC .............................. 411/44, 45, 55, 60.1, 60.2
See application file for complete search history.

(56) References Cited

U.S. PATENT DOCUMENTS

| 2,324,142 | A | | 7/1943 | Eklund | |
|---|---|---|---|---|---|
| 4,883,395 | A | * | 11/1989 | Klaric | ..................... F16B 35/00 411/55 |
| 6,761,520 | B1 | * | 7/2004 | Dise | ...................... F16B 37/067 411/113 |
| 2002/0106256 | A1 | * | 8/2002 | Kaibach | .............. F16B 13/0858 411/60.1 |

(Continued)

FOREIGN PATENT DOCUMENTS

| JP | 1980043127 U | 3/1980 |
|---|---|---|
| JP | 1983182008 U | 12/1983 |

(Continued)

OTHER PUBLICATIONS

International Preliminary Report dated Feb. 11, 2021 cited in corresponding PCT Application No. PCT/JP2019/029257.

*Primary Examiner* — Roberta S Delisle

(74) *Attorney, Agent, or Firm* — Kofi A. Schulterbrandt

(57) ABSTRACT

A blind bolt with a bolt head, a shaft portion on which a male screw is formed, and a bolt. An outer nut having a polygonal outer surface, and an outer nut hole penetrating in the axial direction. A cylindrical valve sleeve formed with a sleeve hole and an inner nut having a cylindrical portion. A nut head portion formed at one end of the cylindrical portion, and an inner nut hole having a female screw formed in a part inside. A plurality of outer peripheral grooves, extending in the outer peripheral direction are formed on the outer circumference of the valve sleeve. The cylindrical portion of the inner nut being inserted into the sleeve hole of the valve sleeve, the tip portion of the cylindrical portion inserted into the outer nut hole of the outer nut to prevent the inner nut from rotating with respect to the outer nut.

11 Claims, 12 Drawing Sheets

(56) References Cited

U.S. PATENT DOCUMENTS

| | | | | |
|---|---|---|---|---|
| 2005/0200066 A1* | 9/2005 | McClure | ............... | F16B 19/109 |
| | | | | 269/47 |
| 2005/0201844 A1* | 9/2005 | Davies | .................. | F16B 19/008 |
| | | | | 411/34 |
| 2008/0213063 A1* | 9/2008 | Pratt | ..................... | F16B 31/021 |
| | | | | 29/428 |
| 2009/0092462 A1* | 4/2009 | Pratt | ....................... | F16B 35/06 |
| | | | | 411/383 |
| 2012/0311947 A1* | 12/2012 | Van Wissen | .......... | F16B 13/066 |
| | | | | 52/250 |
| 2014/0301802 A1* | 10/2014 | Kozak | .................... | F16B 29/00 |
| | | | | 411/55 |
| 2018/0258970 A1* | 9/2018 | Avetisian | .............. | F16B 13/045 |

FOREIGN PATENT DOCUMENTS

| | | | |
|---|---|---|---|
| JP | 10220432 A | 8/1998 | |
| JP | 2000266018 A | 9/2000 | |
| JP | 2000266019 A | 9/2000 | |
| JP | 2017120096 A | 7/2017 | |

* cited by examiner

BLIND BOLT

CROSS-REFERENCE TO RELATED APPLICATIONS

This application is a continuation of PCT Application No. PCT/JP2019/029257, filed on Jul. 25, 2019, which claims priority from Japanese Patent Application No. 2018-143197, filed on Jul. 31, 2018, the entire disclosure of which is incorporated herein by reference.

BACKGROUND OF THE PRESENT INVENTION

The present invention relates to a blind bolt and a fastening structure. In particular, the present invention relates to a blind bolt and a fastening structure that can be fastened with the same fastening load regardless of the plate thickness of the member to be mounted and the mounting member.

Blind rivets equipped with a hollow metal rivet body consisting of a sleeve and a rivet head at one end of the sleeve, and a metal mandrel whose shaft extends through the through hole of the rivet body, are well known. The blind rivet has an advantage in that the member to be mounted and the mounting member can be connected only from one side.

The rivet body of the blind rivet has a rivet head formed at one end and a tubular hollow sleeve extending from the rivet head. The blind rivet mandrel has a head larger than the inner diameter of the sleeve and an elongated shaft extending from the head. The mandrel head is arranged adjacent to one end of the sleeve opposite the rivet head, the shaft is inserted into the through hole of the rivet body, and the mandrel shaft is assembled so as to extend from the rivet head.

The assembled blind rivet is inserted into the mounting hole of a member to be mounted such as a panel, and into the mounting hole of the mounting member such as a decorative part to be mounted on the panel and the like, with the head of the mandrel at the front, and the rivet head is brought into contact with the periphery of the mounting hole of the mounting member. In this state, the rivet head is held with the fastening tool, and when the shaft unit of the mandrel is grasped and pulled out strongly from the rivet head side, one end of the sleeve of the rivet body is deformed so as to expand the diameter, and the mandrel breaks at the thin breakable portion of the shaft portion. The member to be mounted and the mounting member are fastened between the rivet head and the expanded diameter portion of the sleeve.

With the conventional blind rivet, a special fastening tool has been required because the shaft portion of the mandrel is pulled with a strong force to break the thin breakable portion. The load when the mandrel breaks has not been constant, and the fastening state of the member to be mounted and the member to be mounted has sometimes been unstable.

Therefore, fasteners that do not break the mandrel have also come to be used as fastening tools. As such a fastening tool, a blind bolt is equipped with a rivet body having a head unit, a bolt with a male thread, a rivet head unit, and a sleeve formed with a female screw screwed into the male screw of the bolt. By rotating the bolt to engage the male screw with the female screw of the sleeve, the sleeve of the blind bolt is drawn to the rivet head side to expand the diameter, and the member to be mounted and the mounting member are sandwiched between the rivet head and the expanded sleeve.

Patent Document 1 discloses a blind bolt equipped with a bolt, an outer nut, a valve sleeve, and an inner nut. The outer nut is formed with an outer nut hole having a hexagonal cross section. The valve sleeve is cylindrical and is formed with a sleeve hole. The inner nut has a nut cylindrical portion formed with an inner nut hole, and a nut head portion. The male screw of the bolt is screwed into the female screw of the inner nut hole. The nut cylindrical portion of the inner nut slides axially with respect to the outer nut, but is supported so as not to rotate. The valve sleeve is held between the outer nut and the stepped portion of the nut head portion of the inner nut.

To attach the blind bolt of Patent Document 1, when the blind bolt is inserted into the member to be mounted and the mounting hole of the mounting member and the bolt is rotated, the valve sleeve is axially compressed and expanded in diameter between the outer nut and the stepped portion of the nut head portion of the inner nut. The member to be mounted and the mounting member are sandwiched and fastened between the expanded diameter portion and the outer nut.

With the blind bolt of Patent Document 1, the blind bolt can be attached by an operation from one side by using an electric tool for fastening the bolt.

The blind bolt of Patent Document 1 is capable of fastening a mounting member to a mounting member within a certain plate thickness range. However, the fastening load (crimping force) differs depending on the thickness of the member to be mounted and the mounting member. In general, when a thick plate and a thin plate are fastened with the same introduction axial force, the fastening load (crimping force) is lower when fastening a thin plate than when fastening a thick plate. Therefore, it has not been widely used for mounting parts and structures that require a high degree of mounting strength.

Another conventional blind rivet is a blind rivet that is equipped with a bolt and a tubular member. The tubular member has a head, a tubular portion, and an end on which a female thread is formed. A male screw of the bolt is screwed into a female screw of the tubular member, the tubular member is compressed in the axial direction, and the diameter of the tubular portion is expanded to form a diameter-expanded portion. However, such a tubular member of a blind rivet has both a diameter-expanding portion, and an end portion on which a female screw is formed in order to compress the portion where the female screw is formed and the diameter is expanded. The tubular member needs to be made of soft metal in order to increase the diameter, and at the same time, it needs to be made of strong metal so that the female screw is not deformed. Therefore, the female screw of the tubular member cannot withstand a strong force. Consequently, it cannot be fastened with a strong fastening load.

In this way, with conventional blind bolts, a commercially available power tool for bolt fastening is used to form a diameter-expanded portion by screwing the bolt from one side so that the bolt can be attached to the member to be mounted and the mounting member without breaking the mandrel using a fastening tool. However, the blind bolt of Patent Document 1 is problematic in that the fastening load differs depending on the thickness of the member to be mounted and the mounting member. Another problem with other blind rivets is that the member to be mounted and the mounting member cannot be fastened with a strong fastening load. Therefore, there has been a demand for a blind bolt that can be fastened with a strong fastening load and that does not cause a difference in fastening load depending on the plate thickness of the member to be mounted and the mounting member.

[Patent Document 1] Japanese Unexamined Patent Publication No. 2017-120096.

SUMMARY OF THE PRESENT INVENTION

The object of the present invention is therefore to provide a blind bolt that can be fastened with the same strong fastening load regardless of the plate thickness of the member to be mounted and the mounting member.

To achieve this object, the blind bolt of the present invention is equipped with 4 parts: a bolt, an outer nut, a valve sleeve and an inner nut. The inner nut can slide with respect to the outer nut, but cannot rotate. When the male screw of the bolt is screwed into the female screw of the inner nut, the valve sleeve is pressed between the outer nut and the nut head portion of the inner nut to form a diameter-expanded portion. The member to be mounted and the mounting member are sandwiched and fastened between the outer nut and the diameter-expanded portion of the valve sleeve.

The first aspect of the present invention is a blind bolt equipped with a bolt having a bolt head, and a shaft portion adjacent to the bolt head and having a male screw formed therein; an outer nut having a polygonal-shaped outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein a plurality of outer peripheral grooves extending in the outer peripheral direction are formed on the outer circumference of the valve sleeve, the shaft portion of the bolt can be inserted into the inner nut hole of the inner nut, the male screw of the bolt can be screwed into the female screw of the inner nut hole, the cylindrical portion of the inner nut can be inserted into the sleeve hole of the valve sleeve, and the tip portion of the cylindrical portion can be inserted into the outer nut hole of the outer nut so as not to rotate.

The blind bolt consists of a blind bolt assembly equipped with 4 parts: a bolt, an outer nut, a valve sleeve and an inner nut. When the blind bolt assembly is inserted into the member to be mounted and the mounting hole of the mounting member from one side and the male screw of the bolt is screwed into the female screw of the inner nut, the valve sleeve is pressed from both ends between the outer nut and the nut head portion of the inner nut to expand the diameter, and the member to be mounted and the mounting member can be fastened between the outer nut and the diameter-expanded portion.

When a plurality of outer peripheral grooves extending in the outer peripheral direction are formed on the outer circumference of the valve sleeve, depending on the thickness of the member to be mounted and the thickness of the mounting member, one of the outer peripheral grooves may be located near the surface of the member to be mounted, and the valve sleeve can be deformed from the outer peripheral groove portion to be in close contact with the surface of the member to be mounted to form a diameter-expanded portion.

Therefore, it is possible to widen the range of the plate thickness of the member to be mounted and the mounting member that can be fastened with a blind bolt with a strong fastening load.

The valve sleeve has preferably a first cylindrical portion, a first tapered portion; whose wall thickness gradually decreases toward the second cylindrical portion; a second cylindrical portion, which is thinner than the first cylindrical portion; a second tapered portion whose wall thickness gradually increases from the second cylindrical portion; and a third cylindrical portion, which is thicker than the second cylindrical portion.

When the valve sleeve has a first cylindrical portion, a first tapered portion, a second thin cylindrical portion, a second tapered portion, and a third cylindrical portion, the diameter of the second cylindrical portion at the central portion in the axial direction can be easily expanded, and a diameter-expanded portion with a stable shape can be formed.

It is preferable for the outer diameters of the first cylindrical portion, the second cylindrical portion, and the third cylindrical portion of the valve sleeve to be the same.

The outer diameters of the first cylindrical portion, the second cylindrical portion, and the third cylindrical portion of the valve sleeve are the same; when the wall thickness is changed according to the inner diameter, the valve sleeve has a constant outer diameter, so that it can be easily inserted into the member to be mounted and the mounting hole of the mounting member.

The valve sleeve preferably has a cylindrical first cylindrical thin-walled portion with a wall thickness thinner than that of the first cylindrical portion between the first cylindrical portion and the first tapered portion.

When the valve sleeve has a first cylindrical thin-walled portion thinner than the first cylindrical portion between the first cylindrical portion and the first tapered portion, it is possible to reduce the inward protrusion of the first cylindrical thin-walled portion that occurs when the diameter-expanded portion of the valve sleeve is formed, and it is possible to reduce the contact between the inner nut and the valve sleeve and prevent a decrease in crimping force due to friction.

The valve sleeve preferably has a cylindrical third cylindrical thin-walled portion with a wall thickness thinner than that of the third cylindrical portion between the second tapered portion and the third cylindrical portion.

When the valve sleeve has a cylindrical third cylindrical thin-walled portion with a wall thickness thinner than that of the third cylindrical portion between the second tapered portion and the third cylindrical portion, even if the plate thickness of the member to be mounted and the plate thickness of the mounting member change and the position of the diameter-expanded portion of the valve sleeve changes, a sufficiently large diameter-expanded portion can be formed.

It is preferable for the plurality of outer peripheral grooves of the valve sleeve to be formed on the outer periphery from the first cylindrical thin-walled portion to the first tapered portion.

When a plurality of outer peripheral grooves are formed on the outer periphery of the first cylindrical thin-walled portion or the first tapered portion, depending on the plate thickness of the member to be mounted and the mounting member, the outer peripheral groove changes when the diameter-expanded portion of the valve sleeve is formed, and a sufficient crimping force can be obtained even if the plate thickness changes.

The outer nut hole of the outer nut has a polygonal cross section, and the cylindrical portion of the inner nut has a nut slide portion and a cylindrical-shaped nut cylindrical portion adjacent to the nut slide portion; the nut slide portion is formed with slide planes extending in the axial direction at equal intervals in the outer peripheral direction, and when the nut slide portion is inserted into the polygonal inner surface of the outer nut hole, it is preferable for the slide planes to abut the polygonal inner surface of the outer nut hole of the outer nut.

The outer nut hole of the outer nut has a polygonal cross section, and slide planes that match the polygonal inner surface of the outer nut hole are formed on the outer peripheral surface of the cylindrical portion of the inner nut; while the inner nut slides in the axial direction with respect to the outer nut, it can be supported so as not to rotate.

A second aspect of the present invention is a fastening structure in which a member to be mounted having a mounting hole and a mounting member are fastened with a blind bolt; equipped with a bolt having a bolt head and a shaft portion on which a male screw is formed adjacent to the bolt head; an outer nut having a polygonal outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein on the outer circumference of the valve sleeve, a plurality of outer peripheral grooves extending in the outer peripheral direction are formed; the shaft portion of the bolt is inserted into the inner nut hole of the inner nut; the male screw of the bolt is screwed into the female screw of the inner nut hole; the cylindrical portion of the inner nut is inserted into the sleeve hole of the valve sleeve; the tip portion of the cylindrical portion is inserted into the outer nut hole of the outer nut; the valve sleeve is held between one surface of the outer nut and a nut step portion adjacent to the nut head portion of the inner nut, in the mounting hole of the member to be mounted and on the outer circumference of the cylindrical portion of the inner nut; there is a diameter-expanded portion of the valve sleeve adjacent to the surface of the member to be mounted; the member to be mounted and the mounting member are fastened between one surface of the outer nut and the diameter-expanded portion; one outer peripheral groove on the outer circumference of the valve sleeve is located outside the mounting hole of the member to be mounted, and the other outer peripheral groove on the outer circumference of the valve sleeve is located in the mounting hole of the member to be mounted.

When the total thickness of the member to be mounted and the mounting member is relatively thin and one outer peripheral groove on the outer circumference of the valve sleeve is located outside the mounting hole of the member to be mounted, the chevron-shaped apex between the outer peripheral groove located outside the mounting hole and the outer peripheral groove located inside the mounting hole contacts the edge of the hole of the member to be mounted and strongly presses the edge of the hole in the axial direction.

A third aspect of the present invention is a fastening structure in which a member to be mounted having a mounting hole and a mounting member are fastened with a blind bolt; equipped with a bolt having a bolt head and a shaft portion on which a male screw is formed adjacent to the bolt head; an outer nut having a polygonal outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein on the outer circumference of the valve sleeve a plurality of outer peripheral grooves extending in the outer peripheral direction are formed; the shaft portion of the bolt is inserted into the inner nut hole of the inner nut; the male screw of the bolt is screwed into the female screw of the inner nut hole; the cylindrical portion of the inner nut is inserted into the sleeve hole of the valve sleeve; the tip portion of the cylindrical portion is inserted into the outer nut hole of the outer nut; the valve sleeve is held between one surface of the outer nut and a nut step portion adjacent to the nut head portion of the inner nut, in the mounting hole of the member to be mounted and on the outer circumference of the cylindrical portion of the inner nut; there is a diameter-expanded portion of the valve sleeve adjacent to the surface of the member to be mounted; the member to be mounted and the mounting member are fastened between one surface of the outer nut and the diameter-expanded portion; and the plurality of outer peripheral grooves on the outer circumference of the valve sleeve are located in the mounting hole of the member to be mounted.

When the total thickness of the member to be mounted and the mounting member is relatively thick and at least two outer peripheral grooves of the valve sleeve are located in the mounting hole of the member to be mounted, the valve sleeve can be deformed from the portion of the outer peripheral groove near the inlet of the mounting hole of the member to be mounted.

According to the present invention, it is possible to provide a blind bolt that can be fastened with the same fastening load (crimping force) regardless of the plate thickness of the member to be mounted and the mounting member.

DETAILED DESCRIPTION OF THE PREFERRED EMBODIMENTS

Figure 1:
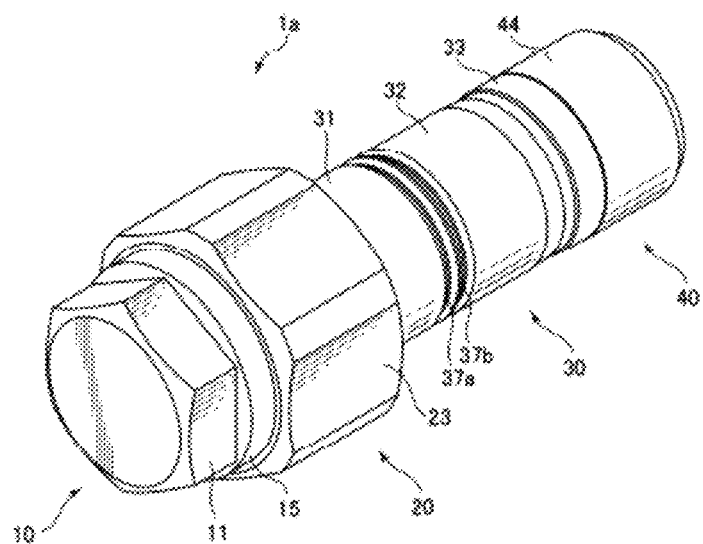
FIG. 1 is a perspective view of a blind bolt assembly according to an embodiment of the present invention.

Hereinafter, the blind bolt 1 according to an embodiment of the present invention will be described with reference to the drawings. The blind bolt 1 includes a bolt 10, an outer nut 20, a valve sleeve 30, and an inner nut 40. In this specification, the bolt 10, the outer nut 20, the valve sleeve 30, and the inner nut 40 are assembled; the state before fastening is referred to as the blind bolt assembly 1a. If necessary, a washer 15 is included between the bolt 10 and the outer nut 20.

Figure 2:
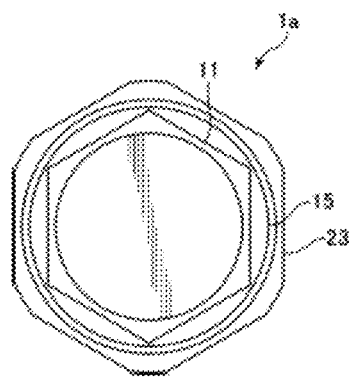
FIG. 2 is a left side view of the blind bolt assembly of FIG. 1.
Figure 3:
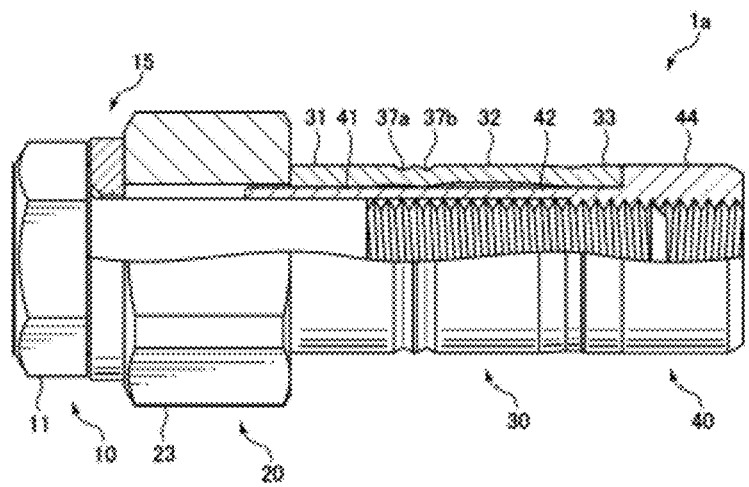
FIG. 3 is a front view showing a part of the blind bolt assembly of FIG. 1 as a cross section.
Figure 4:
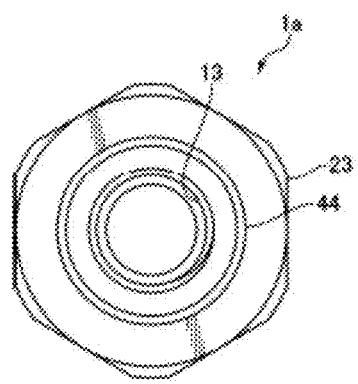
FIG. 4 is a right side view of the blind bolt assembly of FIG. 1.

FIG. 1 is a perspective view of a blind bolt assembly 1a according to an embodiment of the present invention. FIG. 2 is a left side view, FIG. 3 is a front view with a partial cross section, and FIG. 4 is a right side view. The bolt 10 constituting the blind bolt 1, the washer 15, the outer nut 20, the valve sleeve 30, and the inner nut 40 will be described in sequential order.

Figure 5:
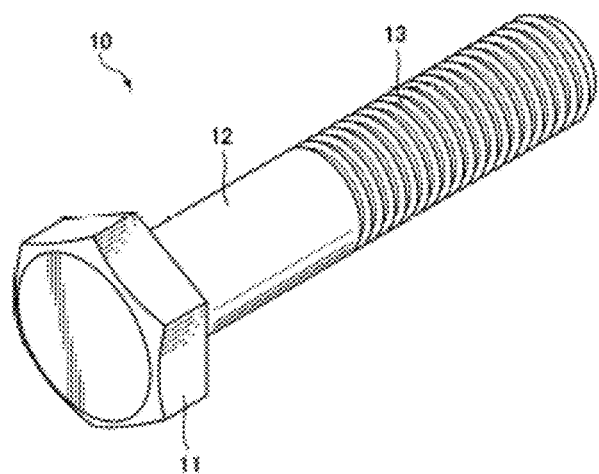
FIG. 5 is a perspective view of a bolt of the blind bolt of FIG. 1.

FIG. 5 is a perspective view of the bolt 10. Bolt 10 is a commercially available bolt. As shown in FIG. 5, the bolt 10 has a short hexagonal column-shaped bolt head portion 11 and a cylindrical shaft portion 12 extending axially from the bolt head portion 11. A male screw 13 is formed on a part of the outer peripheral surface of the shaft portion 12. The bolt 10 is made of a hard metal such as steel or stainless steel. The bolt head portion 11 may have a shape that allows the bolt head to be rotated by a tool even if the cross section is not hexagonal. For example, the cross section may be quadrangular. Alternatively, a bolt having a cross-shaped groove or a hexagonal hole formed in the head of the bolt and can be rotated by a screwdriver, a hexagon wrench, or the like.

Figure 6:
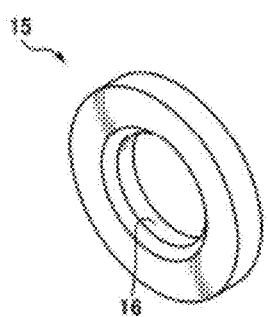
FIG. 6 is a perspective view of the washer of the blind bolt of FIG. 1.

FIG. 6 is a perspective view of the washer 15 of the blind bolt 1 of the embodiment. The washer 15 is a commercially available annular washer, and a washer hole 16 is formed therein. One end of the washer hole 16 is chamfered. The washer 15 is not necessary.

Figure 7:
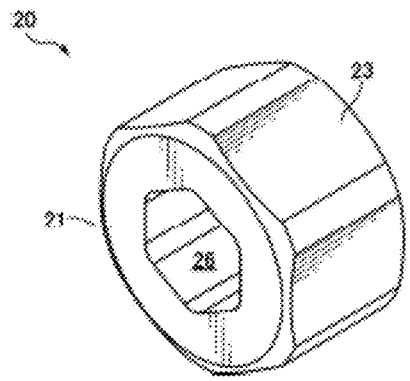
FIG. 7 is a perspective view of an outer nut of the blind bolt of FIG. 1.
Figure 8:
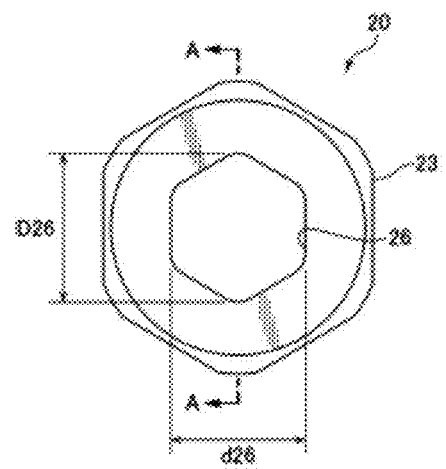
FIG. 8 is a left side view of the outer nut of FIG. 7.
Figure 9:
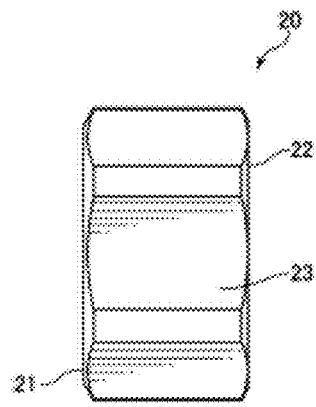
FIG. 9 is a front view of the outer nut of FIG. 7.
Figure 10:
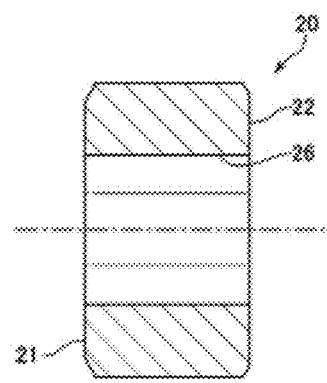
FIG. 10 is a cross-sectional view taken along the line A-A of the outer nut of FIG. 8.

FIG. 7 is a perspective view of the outer nut 20 of the blind bolt 1 of the embodiment. FIG. 8 is a left side view, and FIG. 9 is a front view. FIG. 10 is a cross-sectional view of the outer nut 20 along the line A-A of FIG. 8. The outer nut 20 has a hexagonal column shape similar to that of a normal hexagon nut. It has a first surface 21, a second surface 22, and an outer surface 23 having a hexagonal cross section. An outer nut hole 26 having a hexagonal cross section is formed at the axial center of the outer nut 20. The distance between the opposite sides of the hexagon in the cross section of the outer nut hole 26 is d26. The distance between the opposing vertices of the hexagon in the cross section of the outer nut hole 26 is D26. The distance d26 between the opposite sides of the outer nut hole 26 is larger than the outer diameter of the shaft portion 12 of the bolt 10, and the shaft portion 12 of the bolt 10 can be inserted into the outer nut hole 26.

As will be described later, the nut slide portion 41 of the inner nut 40 can be inserted into the outer nut hole 26. The outer nut 20 has a function of supporting the mounting member 52 and supporting the end of the first cylindrical portion 31 of the valve sleeve 30 when the valve sleeve 30 is expanded in diameter.

The outer nut 20 is made of hard metal. The cross section of the outer nut 20 is hexagonal; however, even if it is not a hexagon, it may be a shape that can rotate the bolt 10 by supporting the outer nut 20 so that it does not rotate. For example, it may be a quadrangle or other shape. When the nut slide portion 41 of the inner nut 40 has a different shape, the shape of the outer nut hole 26 has a different shape according to the shape of the nut slide portion 41.

Figure 11:
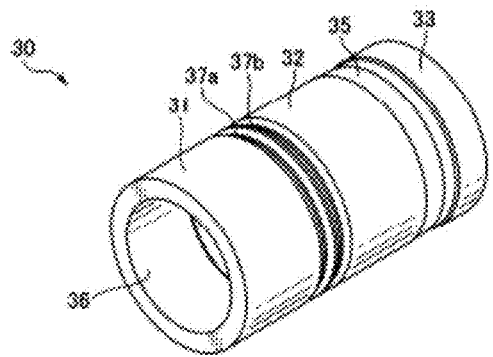
FIG. 11 is a perspective view of the valve sleeve of the blind bolt of FIG. 1.
Figure 12:
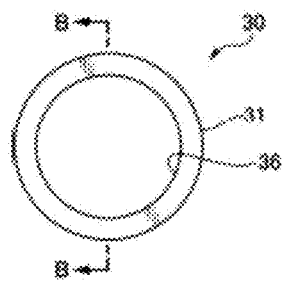
FIG. 12 is a left side view of the valve sleeve of FIG. 11.
Figure 13:
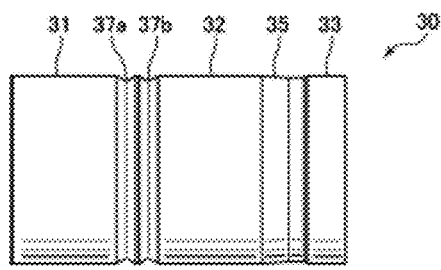
FIG. 13 is a front view of the valve sleeve of FIG. 11.
Figure 14:
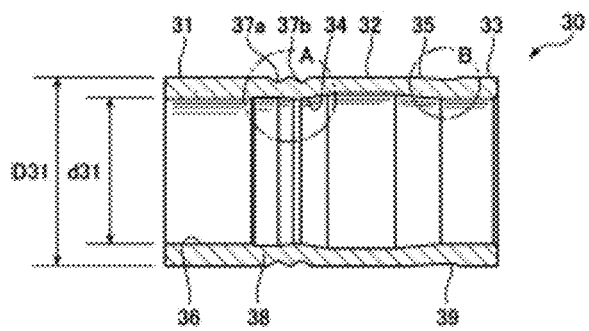
FIG. 14 is a cross-sectional view taken along the line B-B of the valve sleeve of FIG. 12.
Figure 15:
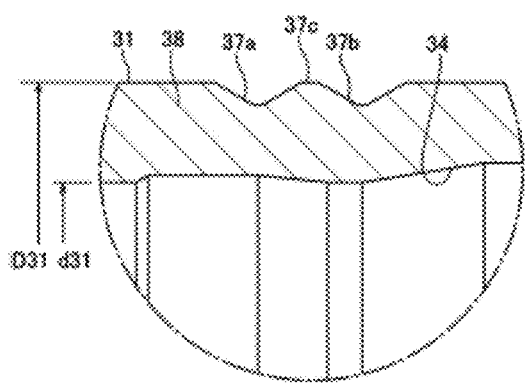
FIG. 15 is an enlarged view of a portion A of the valve sleeve of FIG. 14.
Figure 16:
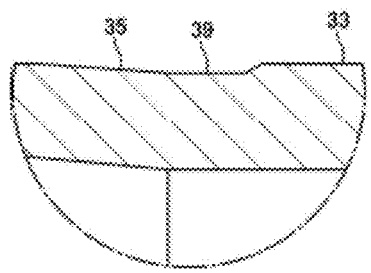
FIG. 16 is an enlarged view of a portion B of the valve sleeve of FIG. 14.

FIG. 11 is a perspective view of the valve sleeve 30 of the blind bolt 1 of the embodiment. "Valve sleeve" refers to an inflatable sleeve. FIG. 12 is a left side view, and FIG. 13 is a front view. FIG. 14 is an enlarged cross-sectional view of the valve sleeve 30 along line B-B of FIG. 12. FIG. 15 is an enlarged view of the A portion, and FIG. 16 is an enlarged view of the B portion of the valve sleeve 30 of FIG. 14. With reference to FIG. 14, the valve sleeve 30 is cylindrical as a whole. A sleeve hole 36 is formed from the end of the first cylindrical portion 31 to the end of the third cylindrical portion 33. Valve sleeve 30 has an outer diameter D31, a first cylindrical portion 31 having an inner diameter d31, a second cylindrical portion 32 having an outer diameter substantially equal to that of the first cylindrical portion 31 and a slightly larger inner diameter, and a third cylindrical portion 33 having approximately the same outer diameter and inner diameter as the first cylindrical portion 31. The wall thickness of the second cylindrical portion 32 is thinner than the wall thickness of the first cylindrical portion 31 and the third cylindrical portion 33. There is a first tapered portion 34 whose inner diameter gradually increases from the first cylindrical portion 31 to the second cylindrical portion 32. There is a second tapered portion 35 whose inner diameter and outer diameter gradually decrease from the second cylindrical portion 32 to the third cylindrical portion 33.

Two outer peripheral grooves 37a and 37b are formed in the circumferential direction on the outer periphery near the boundary between the first cylindrical portion 31 and the first tapered portion 34. In the present embodiment, the outer peripheral grooves 37a and 37b are two, but may be three or more.

As will be described later, at least one outer peripheral groove 37a is formed at a position where it enters the inside of the mounting hole 53 of the member to be mounted 51.

We shall now refer to the enlarged views of FIGS. 15 and 16. The shapes shown in FIGS. 15 and 16 will be described in detail below; however, the shape of the valve sleeve 30 of the present invention is not limited to the shapes shown in FIGS. 15 and 16.

As shown in FIG. 15, the inner diameter of the first cylindrical portion 31 is d31; near the first outer peripheral groove 37a, there is a first cylindrical thin-walled portion 38 having an inner diameter slightly larger than d31. Then, the inner diameter decreases from the position of the outer peripheral groove 37a toward the position of the outer peripheral groove 37b.

Further, in the portion of the second outer peripheral groove 37b far from the first cylindrical portion 31, the inner diameter d31 is the same as that of the first cylindrical portion 31.

When the second cylindrical portion 32 is pushed by the outer nut 20 and the inner nut 40 to increase the diameter, the diameter of the second cylindrical portion 32 side of the first cylindrical portion 31 is slightly reduced inward. The inner diameter of the first cylindrical thin wall portion 38 is slightly larger than that of d31 so as not to come into contact with the inner nut 40.

The top 37c is between the outer groove 37a and the outer groove 37b. The outer diameter of the top 37c is the same as the outer diameter D31 of the first cylinder portion.

The first tapered portion 34 starts from the portion of the outer peripheral groove 37b. The outer diameter of the first tapered portion 34 is the same as the outer diameter D31 of the first cylindrical portion 31. The inner diameter gradually increases toward the second cylindrical portion 32.

The depth of the outer peripheral groove 37a and the depth of the outer peripheral groove 37b are the same. At the position of the outer peripheral groove 37b, the inner diameter of the valve sleeve 30 is smaller than the inner diameter of the valve sleeve 30 at the position of the outer peripheral groove 37a. The wall thickness of the valve sleeve 30 at the position of the outer peripheral groove 37b is thicker than the wall thickness of the valve sleeve 30 at the position of the outer peripheral groove 37a.

As shown in FIG. 16, the outer diameter and inner diameter of the second tapered portion 35 gradually decrease toward the third cylindrical portion 33. Adjacent to the second tapered portion 35, there is a cylindrical third cylindrical thin-walled portion 39 of a cylindrical shape. The outer diameter of the third cylindrical thin-walled portion 39 is smaller than the outer diameter D31 of the third cylindrical portion 33. The inner diameter of the thin-walled portion 39 of the third cylinder is equal to the inner diameter d31 of the third cylindrical portion 33.

The inner diameter d31 of the first cylindrical portion 31 is approximately equal to the distance D26 between the opposing vertices of the hexagons of the outer nut hole 26 of the outer nut 20. The first cylindrical portion 31 does not enter the outer nut hole 26 of the outer nut 20, and the end portion of the first cylindrical portion 31 comes into contact with the second surface 22 of the outer nut 20 and stops.

As will be described later, when the blind bolt 1 is fastened, the valve sleeve 30 is axially pressed by the inner nut 40 and the outer nut 20, the diameter of the second cylindrical portion 32 is expanded to become the diameter-expanded portion 32d, and the member to be mounted 51 and the mounting member 52 are sandwiched and fastened between the diameter-expanded portion 32d and the second surface 22 of the outer nut 20.

The valve sleeve 30 is made of soft metal. The second cylindrical portion 32 of the valve sleeve 30 is thinner than the first cylindrical portion 31 and the third cylindrical portion 33, and is easy to expand in diameter.

When the total plate thickness is thin, the axial length from the first cylindrical portion 31 to the top 37c between the outer peripheral groove 37a and the outer peripheral groove 37b is the same as the total thickness of the member to be mounted 51 and the mounting member 52, and the top portion 37c, the outer peripheral groove 37b, and the second cylindrical portion 32 are arranged to be the diameter-expanded portion 32d.

When the total plate thickness is thick, the axial length of the first cylindrical portion 31 is set so that the outer peripheral groove 37a and the outer peripheral groove 37b can be inserted into the mounting hole 53 of the member to be mounted 51, and the second cylindrical portion 32 becomes the diameter-expanded portion 32d.

Figure 17:
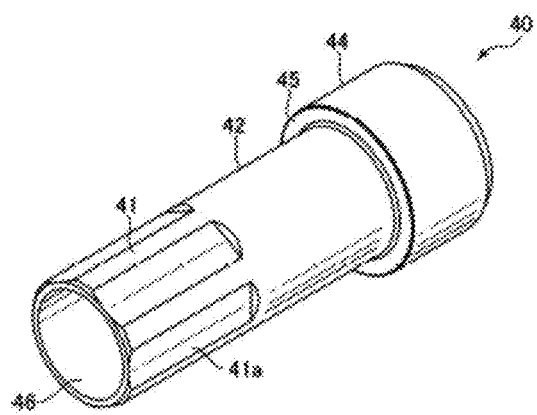
FIG. 17 is a perspective view of an inner nut of the blind bolt of FIG. 1.
Figure 18:
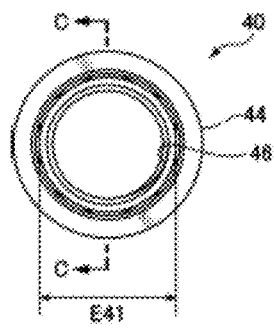
FIG. 18 is a left side view of the inner nut of FIG. 17.
Figure 19:
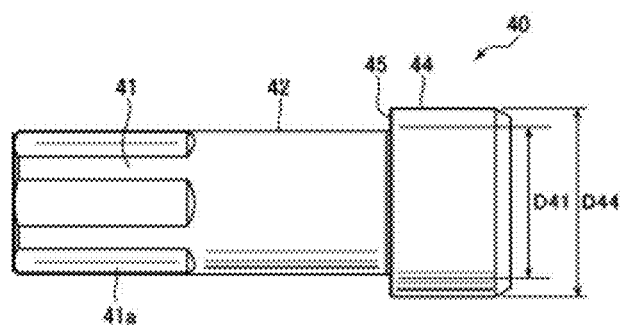
FIG. 19 is a front view of the inner nut of FIG. 17.
Figure 20:
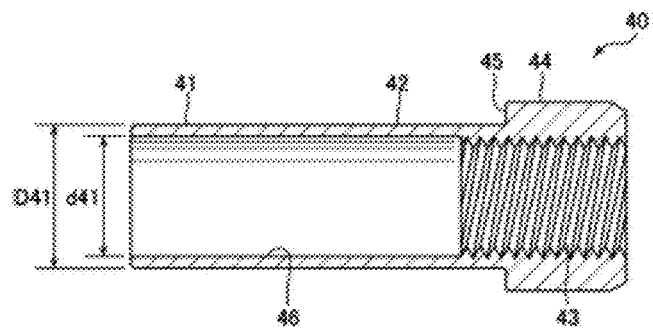
FIG. 20 is a cross-sectional view taken along the line C-C of the inner nut of FIG. 18.

FIG. 17 is a perspective view of the inner nut 40 of the blind bolt 1 of the embodiment. FIG. 18 is a left side view, and FIG. 19 is a front view. FIG. 20 is a cross-sectional view of the inner nut 40 along the line C-C of FIG. 18. The inner nut 40 has a cylindrical portion with an overall cylindrical shape, and a nut head portion 44 at one end of the cylindrical portion.

The cylindrical portion of the inner nut 40 has a nut slide portion 41 at the end and a cylindrical nut cylindrical portion 42 adjacent to the nut slide portion 41. The nut slide portion 41 has a cylindrical shape, and six slide planes 41a extending in the axial direction are formed on the outer peripheral surface at regular intervals in the circumferential direction. The portion between the adjacent slide planes 41a is an extension of the cylindrical shape of the nut cylindrical portion 42.

The outer diameter D41 of the nut slide portion 41 without the slide plane 41a is slightly larger than the distance d26 between the opposing faces of the outer nut hole 26 of the outer nut 20.

The distance E41 between the opposing slide planes 41a of the nut slide portion 41 is shorter than the outer diameter D41 of the nut slide portion 41. The distance E41 is equal to or slightly shorter than the distance d26 between the opposing faces of the outer nut hole 26.

By aligning the angular position of the slide plane 41a with the angular position of the opposite surface of the outer nut hole 26, the nut slide portion 41 can be inserted into the hexagonal outer nut hole 26 of the outer nut 20. The nut slide portion 41 can slide axially on the inner surface of the outer nut hole 26, but cannot rotate in the outer nut hole 26.

The inner diameter d41 of the inner nut hole 46 of the nut slide portion 41 is slightly larger than the outer diameter of the shaft portion 12 of the bolt 10, and the shaft portion 12 of the bolt 10 can be inserted into the inner nut hole 46.

The cylindrical portion of the inner nut 40 has a cylindrical nut cylindrical portion 42 adjacent to the nut slide portion 41. The outer diameters of the nut slide portion 41 and the nut cylindrical portion 42 are the same D41. Inner nut holes 46 are formed in the nut slide portion 41 and the nut cylindrical portion 42. Of the inner nut holes 46, female threads 43 are formed on the inner surfaces of a part of the nut head portion 44 and the nut cylindrical portion 42. The shaft portion 12 of the bolt 10 can be inserted into the inner nut hole 46 from the side of the nut slide portion 41, and the male screw 13 of the bolt 10 can be screwed into the female screw 43 of the inner nut hole 46.

The nut slide portion 41 is a portion in which the slide plane 41a is formed at intervals in the circumferential direction. The axial position of the nut cylinder 42 where the female screw 43 begins does not coincide with the axial position where the slide plane 41a ends. As described above, the nut slide portion 41 and the nut cylindrical portion 42 are collectively referred to as a cylindrical portion.

A nut head portion 44 is formed adjacent to the nut cylindrical portion 42. The outer diameter D44 of the nut head portion 44 is larger than the outer diameter D41 of the nut cylindrical portion 42. A nut step portion 45 is formed between the nut head portion 44 and the nut cylindrical portion 42. The inner nut hole 46 is a through hole that penetrates the nut slide portion 41, the nut cylindrical portion 42, and the nut head portion 44.

The outer diameter D41 of the nut slide portion 41 and the nut cylindrical portion 42 is approximately equal to or slightly smaller than the inner diameter d31 of the first cylindrical portion 31 and the inner diameter d31 of the third cylindrical portion 33 of the valve sleeve 30; the nut slide portion 41 can be inserted into the first cylindrical portion 31, the second cylindrical portion 32, and the third cylindrical portion 33 of the valve sleeve 30.

The outer diameter D44 of the nut head portion 44 is substantially equal to or slightly larger than the outer diameter D31 of the third cylindrical portion 33. The nut step portion 45 at the end portion of the nut head portion 44 can press the end portion of the third cylindrical portion 33.

When the nut slide portion 41 and the nut cylindrical portion 42 of the inner nut 40 are inserted from the third cylindrical portion 33 side of the valve sleeve 30, the nut step portion 45 adjacent to the nut head portion 44 of the inner nut 40 comes into contact with the end portion of the third cylindrical portion 33 and stops.

The axial length of the cylindrical portion of the inner nut 40 including the nut slide portion 41 and the nut cylindrical portion 42 is slightly longer than the total length of the valve sleeve 30. When the nut slide portion 41 of the inner nut 40 is inserted first from the side of the third cylindrical portion 33 of the valve sleeve 30, the nut slide portion 41 of the inner nut 40 slightly protrudes from the end portion of the first cylindrical portion 31 of the valve sleeve 30. The inner nut 40 is made of hard metal.

Returning to FIGS. 1 to 3, the assembly of the bolt 10, the washer 15, the outer nut 20, the valve sleeve 30, and the inner nut 40, which are the components of the blind bolt assembly 1a, will be described.

When the inner nut 40 is inserted from the side of the third cylindrical portion 33 of the valve sleeve 30 with the nut slide portion 41 at the head, the nut step portion 45 of the inner nut 40 comes into contact with the end portion of the third cylindrical portion 33 of the valve sleeve 30 and stops. At this time, the nut slide portion 41 of the inner nut 40 slightly protrudes from the side of the first cylindrical portion 31 of the valve sleeve 30.

The angle position of the slide plane 41a of the nut slide portion 41 of the inner nut 40 is aligned with the angle position of the opposite surface of the outer nut hole 26 of the outer nut 20. When the outer nut 20 is slid from the left side on the outer circumference of the nut slide portion 41 of the inner nut 40, the end of the first cylindrical portion 31 of the valve sleeve 30 comes into contact with the second surface 22 of the outer nut 20, and the outer nut 20 stops. The outer nut 20 is held on the outer circumference of the nut slide portion 41 of the inner nut 40 so as not to rotate.

The shaft portion 12 of the bolt 10 is inserted into the washer hole 16 of the washer 15. The bolt 10 is inserted from the side of the outer nut 20 into the assembly that combines the outer nut 20, the valve sleeve 30, and the inner nut 40. The male screw 13 of the shaft portion 12 of the bolt 10 is screwed into the female screw 43 of the inner nut hole 46 of the inner nut 40. The surface of the bolt head portion 11 is in contact with the surface of the washer 15, and the other surface of the washer 15 is in contact with the first surface 21 of the outer nut 20. The valve sleeve 30 is sandwiched between the second surface 22 of the outer nut 20 and the nut step portion 45 of the inner nut 40.

In this way, the bolt 10, the washer 15, the outer nut 20, the valve sleeve 30, and the inner nut 40 are assembled to form the blind bolt assembly 1a. The washer 15 is not necessary.

The operation of fastening the member to be mounted 51 and the mounting member 52 with the blind bolt assembly 1a will now be described with reference to FIGS. 21 to 24. In the present specification, the member to be mounted 51 refers to a member constituting a structure or the like in civil engineering and construction. The mounting member 52 refers to a member such as a repair/reinforcing part that is mounted on the member to be mounted 51. The member to be mounted 51 is on the blind side, and the mounting member 52 is on the working side.

Figure 21:
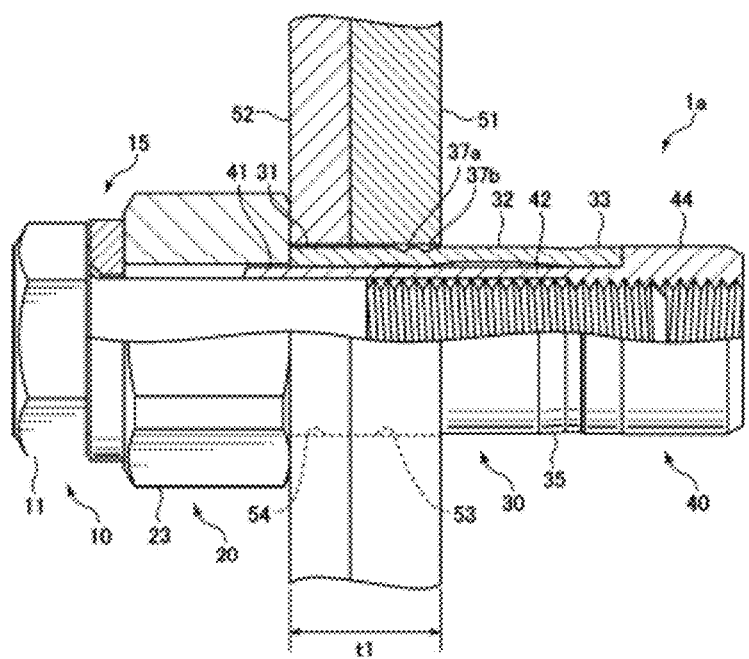
FIG. 21 is a front view as a cross section showing a part of a state in which the blind bolt assembly of FIG. 3 is inserted into a mounting hole of the member to be mounted and the mounting member.

FIG. 21 is a front view showing a cross section of a part of the state in which the blind bolt assembly 1a is inserted into the mounting holes 53 and 54 of the member to be mounted 51 and the mounting member 52.

The total thickness t1 of the member to be mounted 51 and the mounting member 52 is relatively thick (t1=20 mm).

In order to fasten the member to be mounted 51 and the mounting member 52, the mounting hole 53 of the member to be mounted 51 and the mounting hole 54 of the mounting member 52 are aligned, and the member to be mounted 51 and the mounting member 52 are overlapped with each other. The inner diameter of the mounting hole 53 of the member to be mounted 51 and the inner diameter of the mounting hole 54 of the mounting member 52 are larger than the outer diameter of the nut head portion 44 of the inner nut 40 and the valve sleeve 30. The inner nut 40 and the valve sleeve 30 can be inserted into the mounting holes 53 and 54 from the left side. The outer diameter of the outer nut 20 is larger than the inner diameter of the mounting holes 53 and 54 of the member to be mounted 51 and the mounting member 52.

The blind bolt assembly 1a is inserted into the mounting holes 53 and 54 of the member to be mounted 51 and the mounting member 52 with the nut head portion 44 at the head. The second surface 22 of the outer nut 20 comes into contact with the surface around the mounting hole 54 of the mounting member 52 and stops.

The outer peripheral groove 37a of the valve sleeve 30 is located inside the mounting hole 53 of the member to be mounted 51, and the outer peripheral groove 37b is located inside the mounting hole 53 of the member to be mounted 51 near the surface of the member to be mounted 51.

Figure 22:
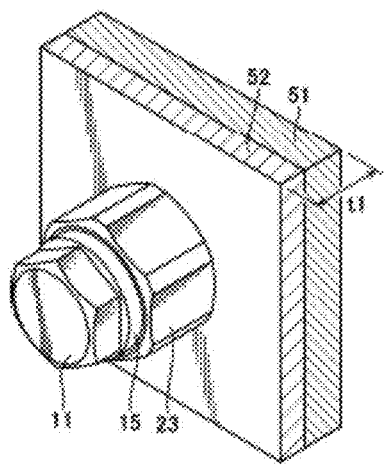
FIG. 22 is a perspective view of a state in which the member to be mounted and the mounting member (the total plate thickness is thick) are fastened by the blind bolt assembly of FIG. 3.
Figure 23:
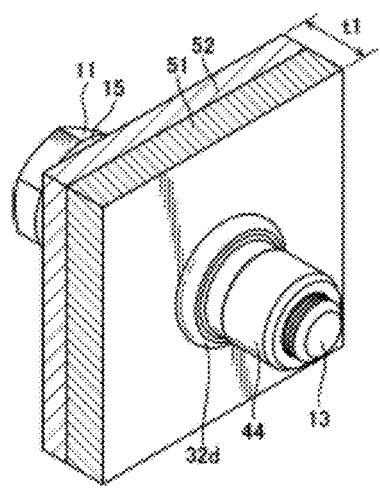
FIG. 23 is a perspective view of the blind bolt assembly of FIG. 22 as viewed from another direction.
Figure 24:
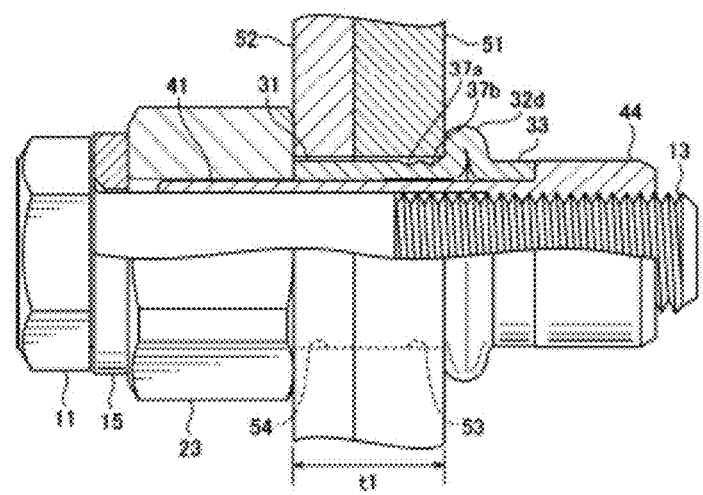
FIG. 24 is a front view of a state in which the member to be mounted and the mounting member (the total plate thickness is thick) are fastened by the blind bolt assembly of FIG. 3.

FIG. 22 is a perspective view showing a state in which the member to be mounted 51 and the mounting member 52 are fastened by the blind bolt assembly 1a. FIG. 23 is a perspective view seen from another direction. FIG. 24 is a front view showing a cross section of a part of a state in which the member to be mounted 51 and the mounting member 52 are fastened by the blind bolt assembly 1a.

The total thickness t1 of the member to be mounted 51 and the mounting member 52 is relatively thick (t1=20 mm).

When the outer nut 20 is held so as not to rotate and the bolt 10 is rotated, the male screw 13 of the bolt 10 is screwed into the female screw 43 of the inner nut 40. Both ends of the valve sleeve 30 are pressed by the second surface 22 of the outer nut 20 and the nut step portion 45 of the inner nut 40. The valve sleeve 30 is made of a softer material than the inner nut 40, which has a female thread 43 and slides in the axial direction. The inner nut 40 does not deform when sliding in the axial direction.

The valve sleeve 30 is deformed from the thin second cylindrical portion 32 by the pressing force of the outer nut 20 and the inner nut 40. Next, the portion of the outer peripheral groove 37b located near the surface of the member to be mounted 51 is deformed, and the second cylindrical portion 32 of the valve sleeve 30 abuts the edge of the mounting hole 53 of the member to be mounted 51. The diameter of the second cylindrical portion 32 of the valve sleeve 30 is expanded to form the diameter-expanded portion 32d. Since the first cylindrical portion 31 and the third cylindrical portion 33 are thick, they are not easily deformed.

The diameter-expanded portion 32d of the valve sleeve 30 abuts the surface around the mounting hole 53 of the member to be mounted 51. The nut slide portion 41 of the inner nut 40 slides in the outer nut hole 26 of the outer nut 20 without rotating.

When the predetermined axial force is reached, the tightening of the bolt 10 is completed, and the tightening operation is completed. By adjusting the tightening force of the bolt 10, the axial force of the blind bolt 1 can be adjusted. The blind bolt 1 fastens the member to be mounted 51 and the mounting member 52 with a strong fastening load.

With reference to FIGS. 21 and 24, even after the valve sleeve 30 has been expanded in diameter, the first outer peripheral groove 37a of the valve sleeve 30 is located in the mounting hole 53 of the member to be mounted 51, and the second outer peripheral groove 37b is located near the entrance of the mounting hole 53, in the mounting hole 53 of the member to be mounted 51. That is, the distance from the end of the valve sleeve 30 on the outer nut 20 side to the second outer peripheral groove 37b is slightly shorter than the total thickness t1 of the member to be mounted 51 and the mounting member 52.

When the diameter of the valve sleeve 30 is expanded while the second outer peripheral groove 37b is near the entrance of the mounting hole 53 of the member to be mounted 51, the diameter of the second cylindrical portion 32 of the valve sleeve 30 is expanded, and the diameter expanded portion 32d is in close contact with the surface around the mounting hole 53 of the member to be mounted 51, so that a fastening load is easily generated.

Since the first cylindrical portion 31 has a thick wall thickness and is located in the mounting holes 53 and 54 of the member to be mounted 51 and the mounting member 52, it is not easily deformed even when the diameter-expanded portion 32d is formed. Since the portion of the first outer peripheral groove 37a is located in the mounting holes 53 and 54 of the member to be mounted 51 and the mounting member 52, it is not easily deformed. Even when the diameter of the valve sleeve 30 is expanded, the axial positions of the outer peripheral grooves 37a and 37b in the mounting holes 53 and 54 hardly change.

Figure 25:
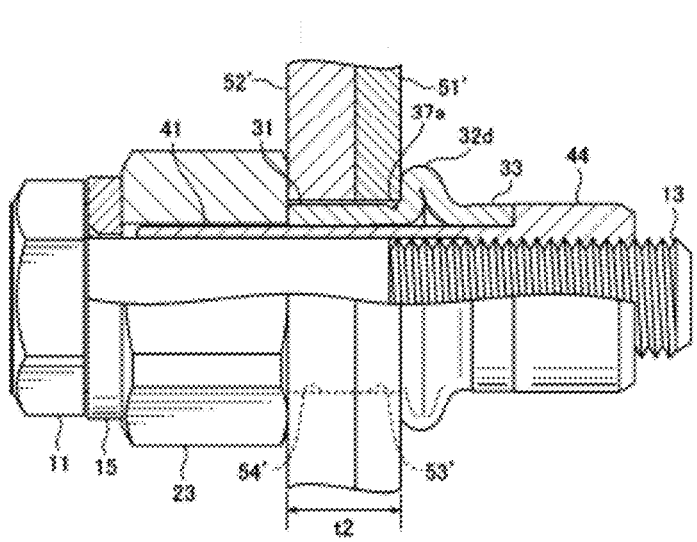
FIG. 25 is a front view showing a state in which the member to be mounted and the mounting member (the total plate thickness is thin) are fastened by the blind bolt assembly of FIG. 3.

In FIG. 25, as in the case of FIG. 24, the member to be mounted 51' and the mounting member 52' are fastened by the blind bolt 1. In FIG. 25, the total thickness t2 of the member to be mounted 51' and the mounting member 52' is thinner than t1=20 mm in FIG. 24, and is t2=15 mm. Before fastening the member to be mounted 51' and the mounting member 52', the first outer peripheral groove 37a of the valve sleeve 30 is located near the inlet in the mounting hole 53' of the member to be mounted 51', and the second outer groove 37b is outside the entrance of the mounting hole 53'.

The valve sleeve 30 easily expands in diameter from the outer peripheral groove 37a near the entrance in the mounting hole 53', and the portion of the top portion 37c becomes the diameter-expanded portion 32d and abuts the edge portion around the mounting hole 53' of the member to be mounted 51'. The diameter-expanded portion 32d of the second cylindrical portion 32 of the valve sleeve 30 is in close contact with the surface around the mounting hole 53' of the member to be mounted 51', and the fastening load is easily generated.

Even when the diameter of the valve sleeve 30 is increased, the axial position of the outer peripheral groove 37a in the mounting holes 53 and 54 hardly changes.

In this way, when two outer peripheral grooves 37a and 37b are formed in the valve sleeve 30 and at least one outer peripheral groove 37a is located in the mounting hole 53 of the member to be mounted 51, it is easily deformed from either the outer peripheral groove 37a or 37b located near the entrance in the mounting hole 53, and the diameter-expanded portion 32d abuts the edge of the mounting hole 53 and comes into close contact with the surface around the mounting hole 53. Therefore, a sufficient fastening load is likely to be generated.

Further, after the diameter-expanded portion 32d comes into contact with the edge portion of the mounting hole 53 of the member to be mounted 51, by further expanding the diameter and bringing it into close contact with the member to be mounted 51, the portion where the diameter-expanded portion 32d abuts the edge of the mounting hole 53 of the member to be mounted 51 is used as a fulcrum, a force acts to pull the first cylindrical portion of the valve sleeve 30 toward the member to be mounted 51, the force with which the end surface of the first cylindrical portion 31 of the valve sleeve 30 pushes the second surface of the outer nut 20 can be reduced, and the fastening load (crimping force) can be increased.

Considering the combined thickness of the member to be mounted 51 and the mounting member 52 to be fastened, a large fastening load can be obtained by setting the axial positions of the outer peripheral grooves 37a and 37b so that one outer peripheral groove 37a or two outer peripheral grooves 37a and 37b are located in the mounting hole 37.

In the valve sleeve 30, a first cylindrical thin-walled portion 38 having an inner diameter of the sleeve hole 36 larger than the inner diameter of the first cylindrical portion 31 is formed between the first cylindrical portion 31 and the first tapered portion 34. When the diameter-expanded portion 32d is deformed so as to be in close contact with the periphery of the mounting hole 53 of the member to be mounted 51 with the portion where the diameter-expanded portion 32d is in contact with the edge of the mounting hole 53 of the member to be mounted 51 as a fulcrum, the first cylindrical thin-walled portion 38, which is on the opposite side of the fulcrum from the diameter-expanded portion 32d, is deformed so as to reduce the diameter. The thin-walled portion 38 of the first cylinder does not strongly contact the cylindrical portion of the inner nut 40 even if the inner diameter is greatly deformed, so that the fastening load (crimping force) can be increased without hindering the pulling of the inner nut.

An experiment was conducted to confirm the effect that the fastening load does not change depending on the thickness of the member to be mounted and the mounting member of the present invention.

The fastening load (crimping force) was measured in the cases when a thick plate with a thickness t1=20 mm, which is a combination of the member to be mounted 51 and the mounting member 52, was fastened with a blind bolt using a conventional valve sleeve (one outer peripheral groove), and when a thin plate having a thickness t2=15 mm, which was a combination of the member to be mounted 51' and the mounting member 52', was fastened.

Similarly, the fastening load (crimping force) was measured in the cases when the thick plate of t1=20 mm was fastened and the thin plate of t2=15 mm was fastened by the blind bolt 1 using the valve sleeve 30 (two outer peripheral grooves 37a, 37b) of the present invention, When fastening a thick plate with t1=20 mm, the first outer peripheral groove 37a of the valve sleeve 30 was in the mounting hole 53 of the member to be mounted 51, and the second outer peripheral groove 37b was located near the entrance in the mounting hole 53.

When fastening a thin plate with t2=15 mm, the first outer peripheral groove 37a of the valve sleeve 30 was located near the inlet in the mounting hole 53' of the member to be mounted 51', and the second outer groove 37b was outside the entrance of the mounting hole 53'.

The number of samples was n=3 for each condition; Table 1 shows the average values of the three measured values. Since the introduction axial force (introduction load), which is the load for tightening the bolts, varies, the values of the fastening load/introduction axial force as well as the fastening load (crimping force) were compared.

TABLE 1

Difference in fastening load depending on the number of outer peripheral grooves of the valve sleeve

| Number of outer peripheral grooves of valve sleeve | Total plate thickness of member to be mounted and mounting member | Introduction axial force (introduction load) kN | Fastening load (crimping force) kN | Fastening load/Introduction axial force |
|---|---|---|---|---|
| 1 groove (traditional) | T1 = 20 mm | 134.9 | 89.0 | 0.64 |
|  | T2 = 15 mm | 131.6 | 64.9 | 0.49 |
| 2 grooves (present invention) | T1 = 20 mm | 125.8 | 82.3 | 0.65 |
|  | T2 = 15 mm | 122.4 | 74.5 | 0.61 |

From the test results in Table 1, when the conventional valve sleeve having one outer peripheral groove is used, the thick plate can be fastened with a sufficient fastening load. Even if an introduction axial force similar to that of a thick plate is applied to a thin plate, the fastening load becomes low. In the thick plate, the outer peripheral groove of the valve sleeve is near the entrance of the mounting hole, and the diameter-expanded portion is formed in close contact with the surface of the member to be mounted 51. With the thin plate, the outer peripheral groove of the valve sleeve goes out of the mounting hole 53', so the valve sleeve is not easily deformed from the vicinity of the surface of the mounting hole 53', and it is considered that the diameter-expanded portion is not formed in close contact with the surface of the member to be mounted 51'.

When the valve sleeve 30 having the two outer peripheral grooves 37a and 37b of the present invention is used, the thick plate can be fastened with a sufficient fastening load. When fastening the thick plate, the first outer peripheral groove 37a is located in the mounting hole 53 of the member to be mounted 51, and the second outer peripheral groove 37b is located near the entrance in the mounting hole 53 of the member to be mounted 51. The valve sleeve 30 has an increased diameter from the second cylinder 32, and the diameter-expanded portion 32d abuts the edge of the mounting hole 53 of the member to be mounted 51 and then comes into close contact with the surface around the mounting hole 53.

When fastening a thin plate, if the same amount of introduction axial force as in the case of a thick plate is applied, a fastening load similar to that of the thick plate can be obtained. When fastening a thin plate, the first outer peripheral groove 37a is near the entrance in the mounting hole 53' of the member to be mounted 51', and the second outer peripheral groove 37b is outside the mounting hole 53'. After the diameter of the second cylindrical portion 32, the outer peripheral groove 37b, and the top portion 37c is expanded and the top portion 37c abuts the edge of the mounting hole 53 of the member to be mounted 51, the diameter-expanded portion 32d is in close contact with the surface around the mounting hole 53 of the member to be mounted 51.

That is, when the valve sleeve 30 having the two outer peripheral grooves 37a and 37b of the present invention is used and the thick plate is fastened, the two outer peripheral grooves 37a and 37b enter the mounting hole 53; when fastening a thin plate, if the positions of the outer peripheral grooves 37a and 37b are set so that one outer peripheral groove 37a enters the mounting hole 53, a fastening load equivalent to that of a thick plate can be obtained even with a thin plate.

In the embodiment of the present invention, the outer nut hole 26 of the outer nut 20 is hexagonal, and the slide planes 41a of the inner nut 40 are six. However, it is not limited to this embodiment. The inner shape of the outer nut and the outer shape of the outer nut hole may be any shape as long as they can be engaged with each other and can slide in the axial direction but cannot rotate. For example, the outer nut holes of the outer nut may be quadrangular, and 4 slide planes may be used for the inner nut.

Alternatively, a plurality of concave recesses extending in the axial direction may be formed in the outer nut hole of the outer nut, and a plurality of axially extending convex portions that fit the concave portions may be formed on the outer peripheral surface of the nut slide portion of the inner nut. By engaging the convex portion with the concave portion, the inner nut can slide with respect to the outer nut without rotating.

What is claim is:

1. A blind bolt equipped with a bolt having a bolt head, and a shaft portion adjacent to the bolt head and having a male screw formed therein; an outer nut having a polygonal-shaped outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein a plurality of outer peripheral grooves extending in the outer peripheral direction are formed on the outer circumference of the valve sleeve, the shaft portion of the bolt can be inserted into the inner nut hole of the inner nut, the male screw of the bolt can be screwed into the female screw of the inner nut hole, the cylindrical portion of the inner nut can be inserted into the sleeve hole of the valve sleeve, and the tip portion of the cylindrical portion can be inserted into the outer nut hole of the outer nut so as not to rotate, wherein the valve sleeve includes a first tapered portion whose inner diameter gradually increases from an inner diameter of a first cylindrical portion to an inner diameter of a second cylindrical portion, and wherein the plurality of outer peripheral grooves are formed between the first cylindrical portion and the second cylindrical portion.

2. The blind bolt of claim 1, wherein the first tapered portion also has a wall thickness that gradually decreases toward the second cylindrical portion, the second cylindrical portion being thinner than the first cylindrical portion.

3. The blind bolt of claim 2, wherein the valve sleeve has a cylindrical shaped first cylindrical thin-wall portion between the first cylindrical portion and the first tapered portion, which is thinner than the first cylindrical portion.

4. The blind bolt of claim 3, wherein the valve sleeve has a cylindrical shaped second cylindrical thin-wall portion between the second tapered portion and the third cylindrical portion, which is thinner than the third cylindrical portion.

5. The blind bolt of claim 3, wherein the plurality of outer peripheral grooves of the valve sleeve are formed on the outer circumference from the first cylindrical thin wall portion to the first tapered portion.

6. The blind bolt of claim 2, wherein the valve sleeve includes a second tapered portion whose wall thickness gradually increases from the second cylindrical portion, and a third cylindrical portion which is thicker than the second cylindrical portion.

7. The blind bolt of claim 6, wherein the outer diameters of the first cylindrical portion, the second cylindrical portion, and the third cylindrical portion of the valve sleeve are the same.

8. The blind bolt of claim 1, wherein the outer nut hole of the outer nut has a polygonal cross section, and the cylindrical portion of the inner nut has a nut slide portion and a cylindrical-shaped nut cylindrical portion adjacent to the nut slide portion; the nut slide portion is formed with slide planes extending in the axial direction at equal intervals in the outer peripheral direction, and when the nut slide portion is inserted into the polygonal inner surface of the outer nut hole, the slide planes abut the polygonal inner surface of the outer nut hole of the outer nut.

9. The blind bolt of claim 1, wherein the plurality of outer peripheral grooves are formed between the first cylindrical portion and the first tapered portion.

10. A fastening structure in which a member to be mounted having a mounting hole and a mounting member are fastened with a blind bolt; equipped with a bolt having a bolt head and a shaft portion on which a male screw is formed adjacent to the bolt head; an outer nut having a polygonal outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein on the outer circumference of the valve sleeve, a plurality of outer peripheral grooves extending in the outer peripheral direction are formed; the shaft portion of the bolt is inserted into the inner nut hole of the inner nut; the male screw of the bolt is screwed into the female screw of the inner nut hole; the cylindrical portion of the inner nut is inserted into the sleeve hole of the valve sleeve; the tip portion of the cylindrical portion is inserted into the outer nut hole of the outer nut; the valve sleeve is held between one surface of the outer nut and a nut step portion adjacent to the nut head portion of the inner nut, in the mounting hole of the member to be mounted and on the outer circumference of the cylindrical portion of the inner nut; there is a diameter-expanded portion of the valve sleeve adjacent to the surface of the member to be mounted; the member to be mounted and the mounting member are fastened between one surface of the outer nut and the diameter-expanded portion; one outer peripheral groove on the outer circumference of the valve sleeve is located outside the mounting hole of the member to be mounted; and the other outer peripheral groove on the outer circumference of the valve sleeve is located in the mounting hole of the member to be mounted.

11. A fastening structure in which a member to be mounted having a mounting hole and a mounting member are fastened with a blind bolt; equipped with a bolt having a bolt head and a shaft portion on which a male screw is formed adjacent to the bolt head; an outer nut having a polygonal outer surface and an outer nut hole that penetrates in the axial direction; a valve sleeve that is cylindrical and is formed with a sleeve hole; and an inner nut having a cylindrical portion, a nut head portion formed at one end of the cylindrical portion, and an inner nut hole that extends in the axial direction and has a female thread formed in a part of the inside; wherein on the outer circumference of the valve sleeve a plurality of outer peripheral grooves extending in the outer peripheral direction are formed; the shaft portion of the bolt is inserted into the inner nut hole of the inner nut; the male screw of the bolt is screwed into the female screw of the inner nut hole; the cylindrical portion of the inner nut is inserted into the sleeve hole of the valve sleeve; the tip portion of the cylindrical portion is inserted into the outer nut hole of the outer nut; the valve sleeve is held between one surface of the outer nut and a nut step portion adjacent to the nut head portion of the inner nut, in the mounting hole of the member to be mounted and on the outer circumference of the cylindrical portion of the inner nut; there is a diameter-expanded portion of the valve sleeve adjacent to the surface of the member to be mounted; the member to be mounted and the mounting member are fastened between one surface of the outer nut and the diameter-expanded portion; and the plurality of outer peripheral grooves on the outer circumference of the valve sleeve are located in the mounting hole of the member to be mounted.

* * * * *